United States Patent
Aruga

(10) Patent No.: US 7,349,164 B2
(45) Date of Patent: Mar. 25, 2008

(54) IMAGING SYSTEM AND OPTICAL COMPONENTS THEREOF

(75) Inventor: Tadashi Aruga, Tokyo (JP)

(73) Assignee: Itochu Aviation Co., Ltd., Tokyo (JP)

( * ) Notice: Subject to any disclaimer, the term of this patent is extended or adjusted under 35 U.S.C. 154(b) by 312 days.

(21) Appl. No.: 11/075,664

(22) Filed: Mar. 10, 2005

(65) Prior Publication Data

US 2006/0203360 A1    Sep. 14, 2006

(51) Int. Cl.
*G02B 9/00* (2006.01)
*G02B 23/24* (2006.01)

(52) U.S. Cl. ............................. 359/754; 359/362

(58) Field of Classification Search ........ 359/643–647, 359/565–576, 754, 745–748, 362
See application file for complete search history.

(56) References Cited

U.S. PATENT DOCUMENTS

| | | | | |
|---|---|---|---|---|
| 5,715,090 A | * | 2/1998 | Meyers | 359/565 |
| 5,715,091 A | * | 2/1998 | Meyers | 359/565 |
| 5,864,430 A | * | 1/1999 | Dickey et al. | 359/559 |
| 6,104,533 A | * | 8/2000 | Clark et al. | 359/566 |

FOREIGN PATENT DOCUMENTS

JP         11-6966       1/1999

OTHER PUBLICATIONS

Suzuki Aizo, Filmcraft of Astrophotograph, Oct. 15, 1977, pp. 66-67 and 140-141 (with partial English translation).

* cited by examiner

*Primary Examiner*—Scott J. Sugarman
*Assistant Examiner*—DaWayne A Pinkney
(74) *Attorney, Agent, or Firm*—Oblon, Spivak, McClelland, Maier & Neustadt, P.C.

(57) ABSTRACT

An imaging system includes a first optical component serving as an image forming part and a second optical component disposed in front of the first optical component relative to an incident light wave. The second optical component and first optical component are jointly provided with a configuration for forming an image on a focal plane. The second optical component is a concave lens-type special optical plate having a focal length infinite in the central part thereof and finite in the periphery thereof. Light past the second optical component has a light wave phase delayed in accordance as a radial distance from the optical axis is increased and has a special wavefront in which its curvature increases in accordance as the radial distance from the optical axis increases after passing the second optical component. Consequently, the wave front curvature after passing through an image forming lens at the image forming part is decreased in accordance with increase of the radial distance.

2 Claims, 9 Drawing Sheets

IMAGING SYSTEM AND OPTICAL COMPONENTS THEREOF

BACKGROUND OF THE INVENTION

1. Field of the Invention

This invention relates to an imaging system which is capable of seeing or photographing objects over a long range without changing a focus, i.e., without changing the position of the focal plane and with a high resolution and, even when obtained images are blurred and the resolution is degraded by atmospheric turbulence, suppressing this degradation.

2. Description of the Prior Art

In the conventional imaging systems, the optical lenses or reflection mirrors which are the components of the device have been adopted on the condition that they are free from spherical aberration, and optical devices, such as the correcting plates, are used for the purpose of correcting the spherical aberration.

Conventional cameras are required to stop down the lens aperture for the purpose of increasing the focal depth and hence the depth of field. The stopping down of the lens aperture results in reduction of the light intensity of reception and degrading the resolution.

Furthermore, a conventional imaging system in the environment condition with atmospheric turbulence suffers image blurring and therefore, encounter difficulty in taking images of high resolution. For the purpose of obtaining an image of high resolution from such a fluctuating image, image processing techniques including the speckle interferometry have been proposed and used. In the conventional image processing techniques, however, special equipment and a long computation time is necessary. Adaptive optics is a new technique to compensate image blurring actively in real time. But, this technique needs large scale and complicated equipment.

In the conventional technique using the optical lenses free from spherical aberration, a camera requires the lens aperture to be stopped down for the purpose of increasing the focal depth. This stopping down of the lens aperture results in reducing the light intensity of reception and degrading the resolution. In the environment condition of atmospheric turbulence, it is necessary to use a compensating optical device, such as adaptive optics, or use a computerized image-processing technique.

This invention has been proposed in view of the state of affairs mentioned above and is aimed at providing an imaging system which is capable of obtaining images with a large focal depth and as well suppressing the image blurring caused by atmospheric turbulence.

This invention is directed toward overcoming problems inherent in conventional techniques by adapting a special optical system, namely by using a telescope or a wavefront controlling plate which is set in front of a fundamental image formation component, such as a camera. By this system, the phase of light is delayed in accordance with increase of radial distance from the optical axis. That is, by controlling the wavefront of light during the course of image formation as specifically described herein below, this invention is enabled to deepen the focal point of a formed image. It is further enabled to suppress image blurring caused by atmospheric turbulence, and form an image of objects with a high resolution over a long distance.

SUMMARY OF THE INVENTION

With a view to accomplishing the object mentioned above, the present invention provides an imaging system that comprises a first optical component serving as an image forming part and a second optical component disposed in front of the first optical component relative to an incident light wave, wherein the second optical component and first optical component are jointly provided with a configuration for forming an image on a focal plane, the second optical component is a concave lens-type special optical plate having a focal length infinite in the central part and finite in the periphery thereof, and the light past the second optical component has a light wave phase delayed in accordance as a radial distance from the optical axis is increased, and hence has a special wavefront in which the curvature increases in accordance as the distance from the optical axis increases after passing the second optical component, and consequently, the wavefront curvature after passing through an image forming lens at the image forming part is decreased in accordance with increase of the radial distance.

The present invention also provides an optical component that is disposed in front of an eye or an imaging camera including a system with an image magnifier, such as a telescope, wherein the optical component contains a concave lens-type wavefront controlling plate having a focal length infinite in the central part and finite in the periphery thereof (the focal length decreases toward outside), and serving to control the shape of the wavefront of the light passing through the optical component, the light past the wavefront controlling plate has a light wave phase delayed in accordance as the distance from the optical axis is increased and has a wavefront in which the curvature increased in accordance as the radial distance from the optical axis increases after passing through the optical component, and consequently, the wavefront curvature after passing through an image forming lens at the image forming part is decreased in accordance with the increase of the radial distance.

DETAILED DESCRIPTION OF THE PREFERRED EMBODIMENT

Figure 1:
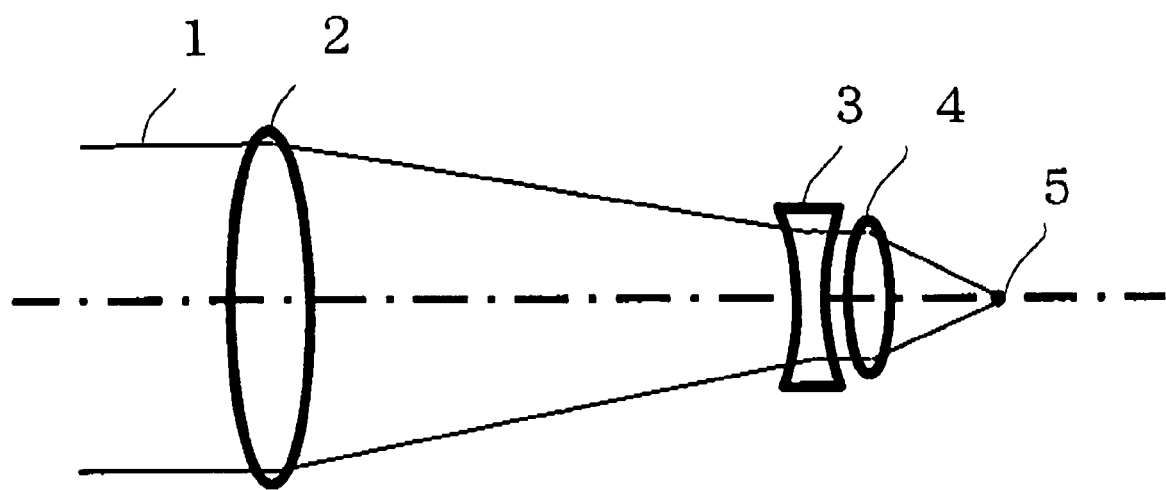
FIG. 1 is a schematic diagram for explaining the embodiment of this invention.

For a start, the present invention will be outlined below. In preparation for imaging an object, this invention contemplates placing, in front of an image forming optical system, a special optical component in which the phase is delayed in accordance as the radial distance from the optical axis is increased toward the edge of aperture, and the curvature of the image forming light is decreased in accordance as the radial distance from the optical axis is increased.

Here, with respect to the term "delay of phase," the following definition applies. The statement that a given lens incurs a delay of phase, for example, describes the case in which the phase is delayed from a phase by a lens which is assumed to possess a sectional form approximating most closely the cross section of this lens and to be free from spherical aberration. The words "most closely" as used herein means that the integration of areas of difference of the form is minimized. When the lens has a difference in refractivity, the comparison is made with respect to the sectional form thereof. Then, the statement that the phase is delayed with respect to an optical component describes the case in which the component lenses or specular reflectors of the optical component individually incur a delay of phase with reference to an optical component reconfigured with lenses or specular reflectors assumed to have no spherical aberration.

When the particular optical component possessing the function described above is placed in front of the image forming component, the wavefront of the light emitted from the image forming lens assumes a deformed spherical surface in the place of a normal spherical surface having a fixed curvature. The wavefront assumes a form having the outer side arched backwardly since the phase is delayed accordingly as the radial distance from the optical axis is increased toward the aperture edge. Thus, the wavefront assumes a spherical surface deformed increasingly more on the inner side and increasingly less on the outer side.

For getting the special condition of phase to be delayed more in accordance as it advances from the optical axis toward the edge, the optical component allowing the phase to be delayed more in accordance as it advances from the optical axis toward the aperture edge is realized, for example, by using a special Galilean telescope, i.e., using a normal lens having no spherical aberration as an objective and a concave lens possessing a proper negative spherical aberration as an eyepiece. The concave lens having a negative spherical aberration can be realized by increasing the thickness of a concave lens having no aberration more toward the periphery thereof and consequently giving this lens a form allowing the phase of the passing light to be delayed. The same effect is obtained by conferring a negative spherical aberration on an objective. Although the device for effecting this formation is more difficult to obtain than when the aforementioned eyepiece having a negative spherical aberration is obtained, it is not impracticable. The use of a wavefront controlling plate, the phase of which is delayed increasingly more toward the periphery, is one important approach since the plate is simpler and more compact than a device of lens combination. This device can be attached to a telescope or fitted directly to an imaging system.

Here, the case of FIG. 1 which uses a concave lens possessing a negative spherical aberration as an eyepiece will be described. In the configuration, an image forming lens 4 is used as a first optical component, an eyepiece 3 possessing a negative spherical aberration as a second optical component, and an objective 2 free from the spherical aberration as a third optical component. Incident light 1 emitting from an object enters into a telescope via the objective 2, released from the eyepiece 3 possessing the negative spherical aberration and passed through the image forming lens 4 so as to form an image on an image forming point 5. When the objective 2 and the eyepiece 3 possessing the negative spherical aberration are set together, they manifest the function of a telescope. First, the principle underlying the characteristic feature that by adopting the configuration illustrated in FIG. 1, it is made possible to suppress image blurring and degradation of resolution caused by atmospheric turbulence and enlarge the focal depth in consequence of deepening the image forming focal point and decreasing the image forming spot size as well will be described below.

Figure 2A:
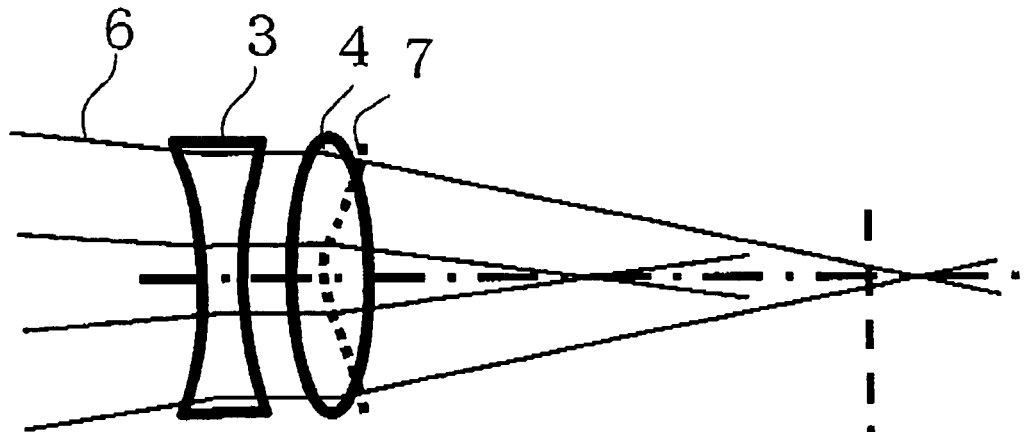
FIG. 2(A) depicting the case of seeing an object at a long distance and FIG. 2(B) the case of seeing an object at a near distance.
Figure 2B:
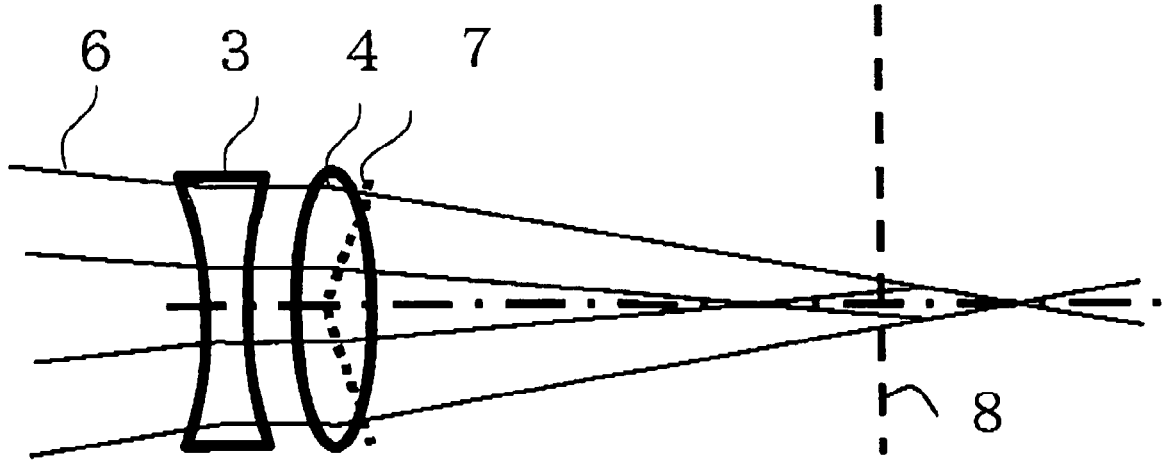
FIG. 2 is a schematic diagram for explaining the embodiment of this invention.
Figure 3:
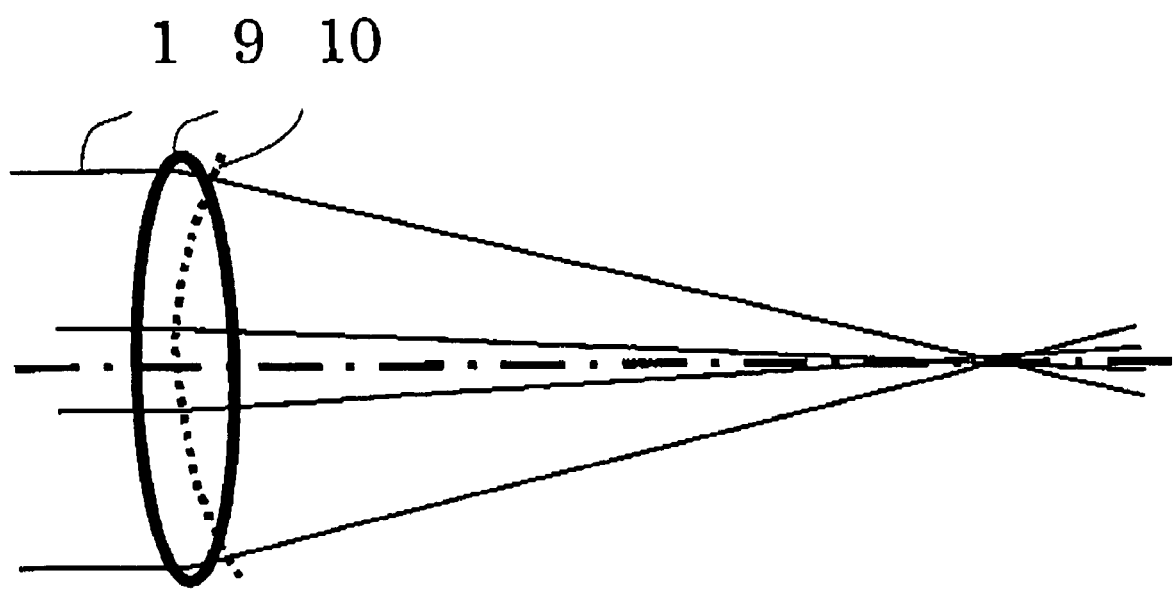
FIG. 3 is a diagram illustrating the configuration of a conventional optical component.

FIG. 2 illustrates a basic concept of the formation of an image by the optical component of FIG. 1. FIG. 2(A) depicts the case of seeing an object placed at a long distance and FIG. 2(B) the case of seeing an object placed at a short distance. Light 6 emanating from the objective 2 of the telescope is passed through the eyepiece 3 possessing a negative spherical aberration and then concentrated by the image forming lens 4 at the focal point. On this occasion, since a wavefront 7 of a deformed spherical surface is formed owing to the effect of the negative spherical aberration of the eyepiece 3, the light passing a more outer position than the optical axis of the eyepiece 3 forms a focal point more rearward and the light passing a more inner position forms a focal point more forward. Namely, the focal point gains in depth. Though the focal point generally is shifted much farther in accordance as the object is placed at a nearer distance, the domain of focal points partly overlaps because of the deep focal point. When the position designated by a broken line 8 in FIG. 2 forms the position of an imaging plane of the camera of one fixed focal point, for example, objects placed over a far distance through a near distance can be imaged. The light which forms an image at the position of the focal plane at this time has a characteristic property of causing the part of the light from an object at a farther distance to pass the outer side of the eyepiece 3 and the part of the light from an object at a nearer distance to pass the inner side thereof when they are concentrated on the imaging plane. Owing to this phenomenon, the imaging system of this invention is enabled to deepen the focal point and, on the occasion of objects placed over a long range, to obtain image without changing the position of the focal plane. In contrast, the conventional optical component is so configured as to confer a spherical wavefront on the light 1 from an image forming lens (convex lens) 9 and concentrate the light at one focal point as illustrated in FIG. 3.

Figure 4:
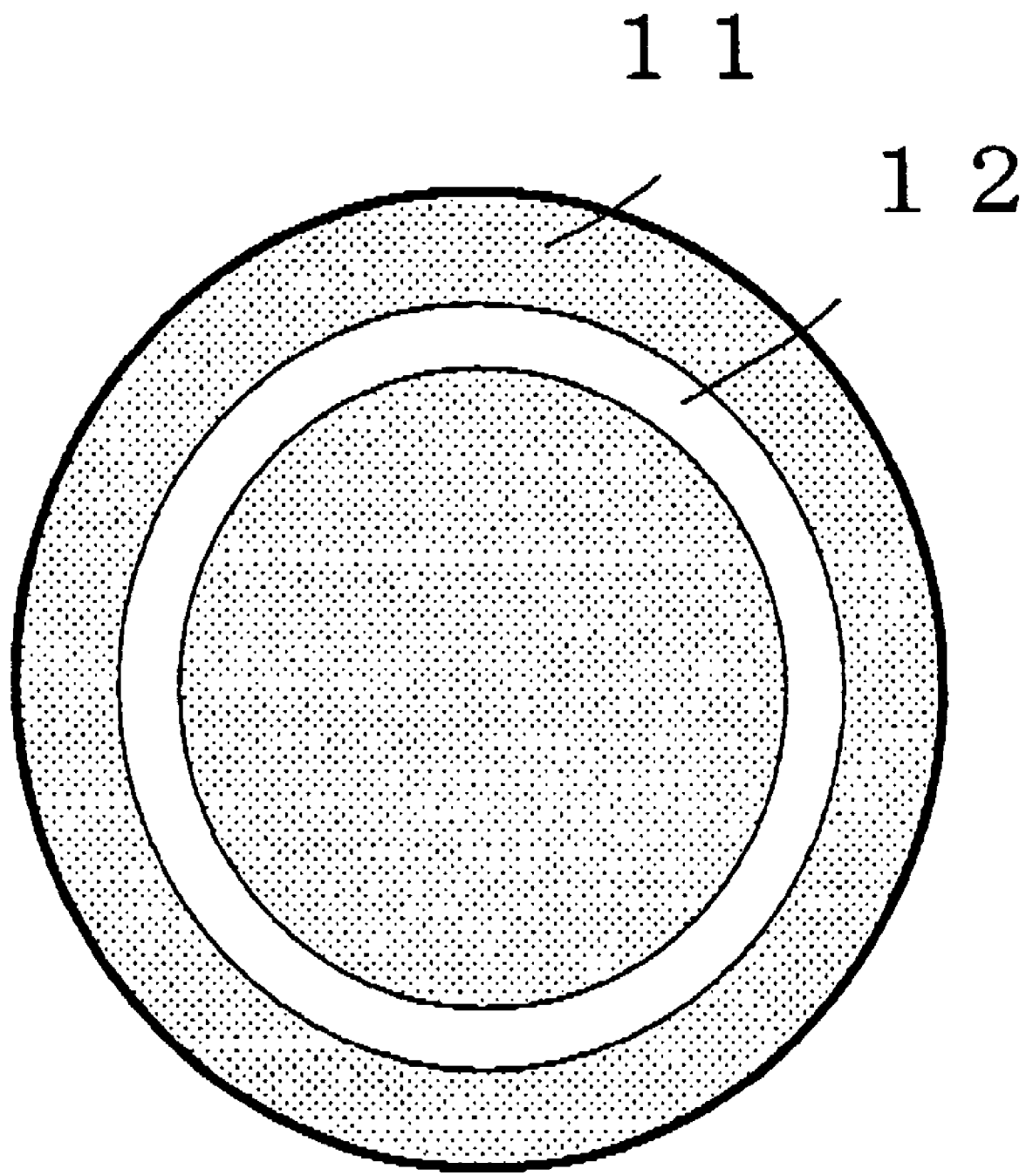
FIG. 4 is a schematic diagram for explaining the cause for producing the characteristic feature of this invention.

A more detailed review of the state of concentration of the light in the domain of focal points justifies the following inference. In the case of the conventional image formation illustrated in FIG. 3, it is well known that the entire region of a wavefront 10 emitted from the image forming lens 9 contributes to the formation of an image. This is because the light 1 emanating from the entire wavefront 10 has an identical phase. In the case of the image formation according to this invention illustrated in FIG. 2, since the eyepiece possessing the negative spherical aberration forms a wavefront of deformed spherical surface, only part of the entire wavefront, particularly an annulus 12 shown in FIG. 4, possesses an identical phase and contributes to the image formation on the focal plane 8 shown in FIG. 2. In the image formation of the light on this focal plane, the light from an object at a far distance has the part of the annulus on the outer side contribute to the image formation and the light from an object at a near distance has the part of the annulus on the inner side contribute to the image formation. Thus, the annuluses corresponding to the individual distances contribute to the image formation. Denoted by reference numeral 11 in FIG. 4 is an aperture.

It is evident from the simulation based on the theoretical formula shown specifically hereinafter that when the image formation is attained by the contribution of the annulus, the profile of light intensity during the course of the image formation narrows the width of the main lobe more and heightens the resolution more than when the entire wavefront contributes to the image formation as in the conventional optical component. This fact constitutes another characteristic feature of this invention.

Now, for the sake of more detailed explanation, the method of computer simulations as well as theoretical analyses according to this invention and the result thereof will be shown below. First, let $f_1$, $f_2$, and $f_3$ respectively stand for the focal lengths of the objective 2, eyepiece 3 and image forming lens 4. It is defined that $d_0$ ($d_0=f_1-f_2$) denotes the stationary distance between the objective and the eyepiece, $\Delta$ denotes the amount of shift from the stationary distance, $\Delta_c$ (given as a negative value) denotes the spherical aberration at the terminal of the effective diameter of the eyepiece, and $d_1$ denotes the distance between the eyepiece 3 and the image forming lens 4. For the purpose of enlarging the visual field as much as possible, $d_1$ must be decreased to the fullest possible extent. Under this condition, the effective radius of the image forming lens equals the effective radius of the eyepiece.

The curvature of the light wavefront is used conveniently for accurately calculating the light intensity at the focal point during the course of the image formation. Thus, the following explanation is given based on the curvatures of the wavefronts. Since the curvature of a wavefront is the reciprocal of the radius of curvature, the curvatures of the wavefronts of the incoming and outgoing light beams in the objective 2, eyepiece 3 and image forming lens 4 are correlated by a formula of geometrical optics. Where L stands for the distance of an object, the curvature of the incident light into the objective 2 will be expressed as 1/L. In this case, the incident light is assumed to be the light radiated from one point on the object. Where b stands for the radius of curvature of the outgoing light emanating from the objective (the radius is measured as a distance to the point at which the light beams intersect at one point), the curvature will be expressed as 1/b. The following formula is established for the incoming and outgoing light beams of the objective 2.

$$\frac{1}{L} + \frac{1}{b} = \frac{1}{f_1} \quad \text{(Formula 1)}$$

Regarding the curvatures of wavefronts of the incoming and outgoing light beams in the eyepiece 3 and the image forming lens 4, g and h stands respectively for the radiuses of curvature of the wavefronts of the outgoing light from the relevant lenses, and the following formulae 2 and 3 are introduced similarly to Formula 1.

$$-\frac{1}{b-(d_0+\Delta)} + \frac{1}{g} = -\frac{1}{f_2} \quad \text{(Formula 2)}$$

$$-\frac{1}{g-d_1} + \frac{1}{h} = \frac{1}{f_3} \quad \text{(Formula 3)}$$

In Formula 2, the focal length of the concave lens $f_2$ is used as a negative value. Here, the magnitudes are given in the form of positive values and the formula is preceded by a negative sign. When $d_1$ is given a sufficiently small magnitude, since $g \gg d_1$, Formula 3 is approximated as follows.

$$\frac{1}{h} = \frac{1}{g} + \frac{1}{f_3} \quad \text{(Formula 4)}$$

When the term 1/g in Formula 4 is transferred with Formula 2, the following equation is obtained.

$$\frac{1}{h} = -\frac{1}{f_2} + \frac{1}{b-(d_0+\Delta)} + \frac{1}{f_3} \quad \text{(Formula 5)}$$

Where $S(\rho)$ stands for the spherical aberration of the eyepiece 3, then $f_2$ will be reduced into $f_2+S(\rho)$ in consideration of the spherical aberration. Consequently, the following Formula 6 is introduced.

$$\frac{1}{h} = -\frac{1}{f_2+S(\rho)} + \frac{1}{b-(d_0+\Delta)} + \frac{1}{f_3} \quad \text{(Formula 6)}$$

Here, the spherical aberration $S(\rho)$ is a longitudinal spherical aberration and is defined as the amount of deviation of the focal point (the point of intersection with the optical axis) of the light emitted from the wavefront of the radius $\rho$ in the direction of the optical axis. It is provided that $\rho$ is the radius defined between 0 and 1 and is a dimensionless parameter. When a radius having a unit of length is separately defined, $\rho_a$ is used for denoting this radius, and "a" is used for denoting the effective radius of the eyepiece, the following formula is derived.

$$\rho_a = \rho a \quad \text{(Formula 7)}$$

The effective radius of the image forming lens also assumes "a" as its magnitude since a small distance between the eyepiece and the image forming lens is generally used.

Subsequently, the form of the wavefront is determined by using the curvature of the wavefront of the light of Formula 5 emitted from the image forming lens. Let define $\theta(\rho)$ as a tangential angle relative to the plane orthogonal to the optical axis of a wavefront, which radius of curvature is h, i.e., having a curvature of 1/h at the point of radius $\rho$, then the following formula will be obtained approximately.

$$\theta(\rho) = \frac{\rho_a}{h} \quad \text{(Formula 8)}$$

By using Formulae 5, 6 and 7 and the relations of $S(\rho) \ll f_2$ and further assuming $d_0=f_1-f_2$ and further assuming $\Delta << f_2, f_1, b$, because $\Delta$ is generally sufficiently smaller than $f_2, f_1$ and $b$, it is made possible to transform Formula 8 as follows.

$$\theta(\rho) = \left\{ \frac{-(b - f_1 - \Delta) + S(\rho)}{f_2^2} + \frac{1}{f_3} \right\} \rho a \quad \text{(Formula 9)}$$

Formula 9 represents the case of providing an eyepiece with a spherical aberration. An objective is likewise capable of being provided with a spherical aberration. In this case, $f_1$ is changed to $f_1 + S(\rho)$.

Since the angle of inclination of the tangential line of the wavefront is $\theta(\rho)$ the height $\zeta(\rho)$ in the direction of the optical axis of the wavefront relative to the standard surface of the wavefront (the plane orthogonal to the optical axis at the position of the image forming lens) constitutes a function representing the form of the wavefront. This function is expressed as follows.

$$\zeta(\rho) = \int \theta(\rho) d\rho_a = a \int \theta(\rho) d\rho \quad \text{(Formula 10)}$$

Although, expansion of $S(\rho)$ has high-order functions, $S(\rho)$ changes gradually. Here, for the purpose of facilitating the integration, it is approximated on the first order, thus $S(\rho) = \Delta_c \rho$. Since it is a best condition that the effect of the spherical aberration is uniform relative to the direction of radius, $S(\rho)$ is preferably approximated to the linear form. In the single lens, the spherical aberration $S(\rho)$ increases in the manner of a square function of $\rho$. By combining a plurality of lenses and using the sufficiently inner sides of the lenses as an effective radius, however, the spherical aberration is enabled to conform to such a condition even from the standpoint of design. Consequently, the $\zeta(\rho)$ of Formula 10 is given by the following formula.

$$\zeta(\rho) = \frac{1}{2} \rho^2 a^2 \left\{ \frac{-(b - f_1 - \Delta) + (2/3)\Delta_c \rho}{f_2^2} + \frac{1}{f_3} \right\} \quad \text{(Formula 11)}$$

$$b = \frac{f_1 L}{L - f_1}$$

Formula 11 indicates that it permits determination of the form of the wavefront of the light emitted from the image forming lens into which the light radiated from the point of a distance L is entered. In the parentheses { } of Formula 11, the first term represents the curvature due to the incidence of the light from a finite distance and the third term the curvature due to the image forming lens and the curvatures each form a wavefront, each term forms a image devoid of deformation. In contrast, the second term represents the curvature due to the spherical aberration. This curvature gives rise to a deformation in the wavefront.

Next, the intensity distribution of the light spot formed as focused in the domain of focal points by the deformed spherical wavefront in the form of $\zeta(\rho)$ emitted from the image forming lens is determined. When the center of the image forming lens is regarded as the origin of coordinate and the coordinates of the point P in the domain of focal points subjected to determination of light intensity are indicated as $(z, r)$ in a spherical coordinate ("z" denoting the distance in the direction of the optical axis and "r" the distance in the direction of radius $[r=(x^2+y^2)^{1/2}]$), the amplitude $u(P)$ of the electric field at the point P is expressed as the Fresnel integral having axial symmetry by the following formula.

$$u(P) = c_1 \int_0^1 J_0\left(r \frac{k}{z} a\rho\right) \quad \text{(Formula 12)}$$

$$\exp\left[-i\left\{\frac{k}{2z} a^2 \rho^2 - k\zeta(\rho)\right\}\right] \rho \, d\rho$$

In the formula, "k" denotes the wave-number which is found by the formula $k=2\pi/\lambda$, wherein $\lambda$ stands for the wavelength of light, and $J_0$ denotes the Bessel function of the $0^{th}$ order, and $c_1$ denotes an integral constant. The light intensity $I(P)$ at the point P is expressed as follows.

$$I(P) = |u(P)|^2 \quad \text{(Formula 13)}$$

The integral constant $c_1$ is determined by the following formula.

$$\int I(P) dx dy = 1 \quad \text{(Formula 14)}$$

Figure 5A:
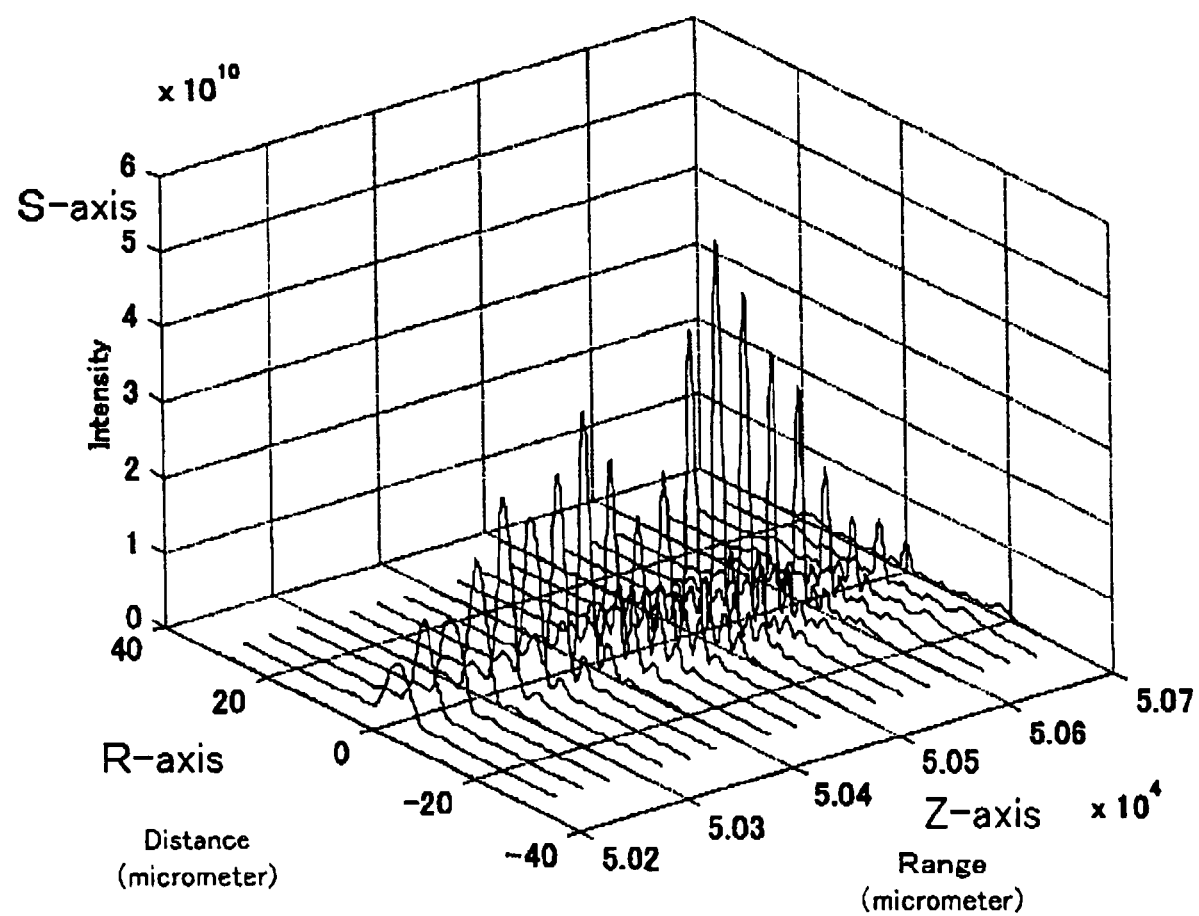
FIG. 5 is a diagram illustrating the state of image formation attained by the imaging system of this invention, FIG. 5(A) depicting the case of seeing an object at a distance of 1 km and FIG. 5(B) the case of seeing an object at a distance of 100 m.
Figure 5B:
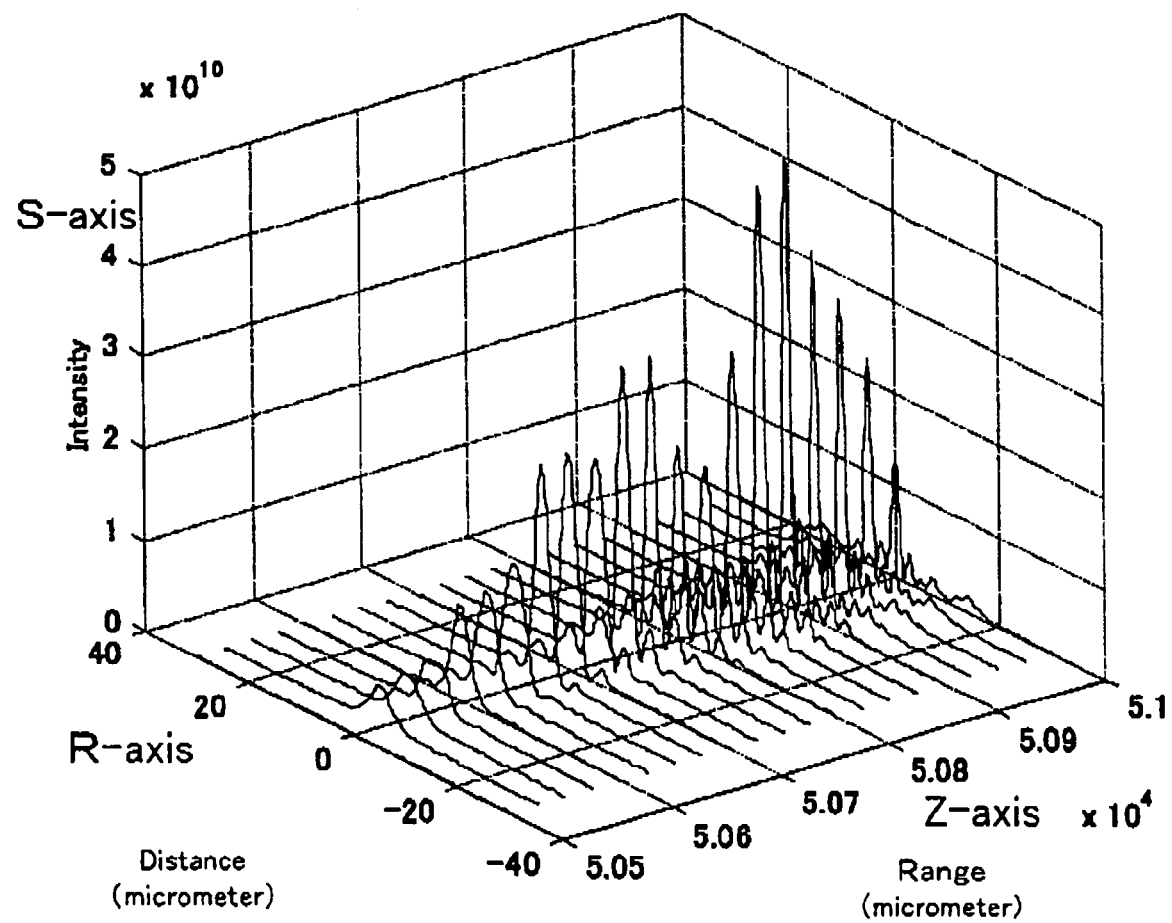

The results of the calculation by Formulae 12 and 13 of the light intensity in the domain of focal points due to the image formation in accordance with this invention are shown in FIG. 5(A) and FIG. 5(B). FIG. 5 shows the light intensity in the direction of height (S axis) and the cross directions show the distance in the direction orthogonal to the optical axis (R axis) and the distance in the direction along the optical axis (Z axis). In the calculation of FIG. 5, the distance to the object is calculated under the condition of L=1 km in FIG. 5(A) and L=100 m in FIG. 5(B) by assuming $f_1$=20 cm, $f_2$=5 cm, $f_3$=5 cm, a=1.25 cm, $\Delta$=0, $\Delta_c$=−600 μm, and the wavelength $\lambda$=0.5 μm. In this case, the diameter of the opening of the objective is 5 cm because the magnifying power of the telescope $f_1/f_2$ is 4.

Figure 6:
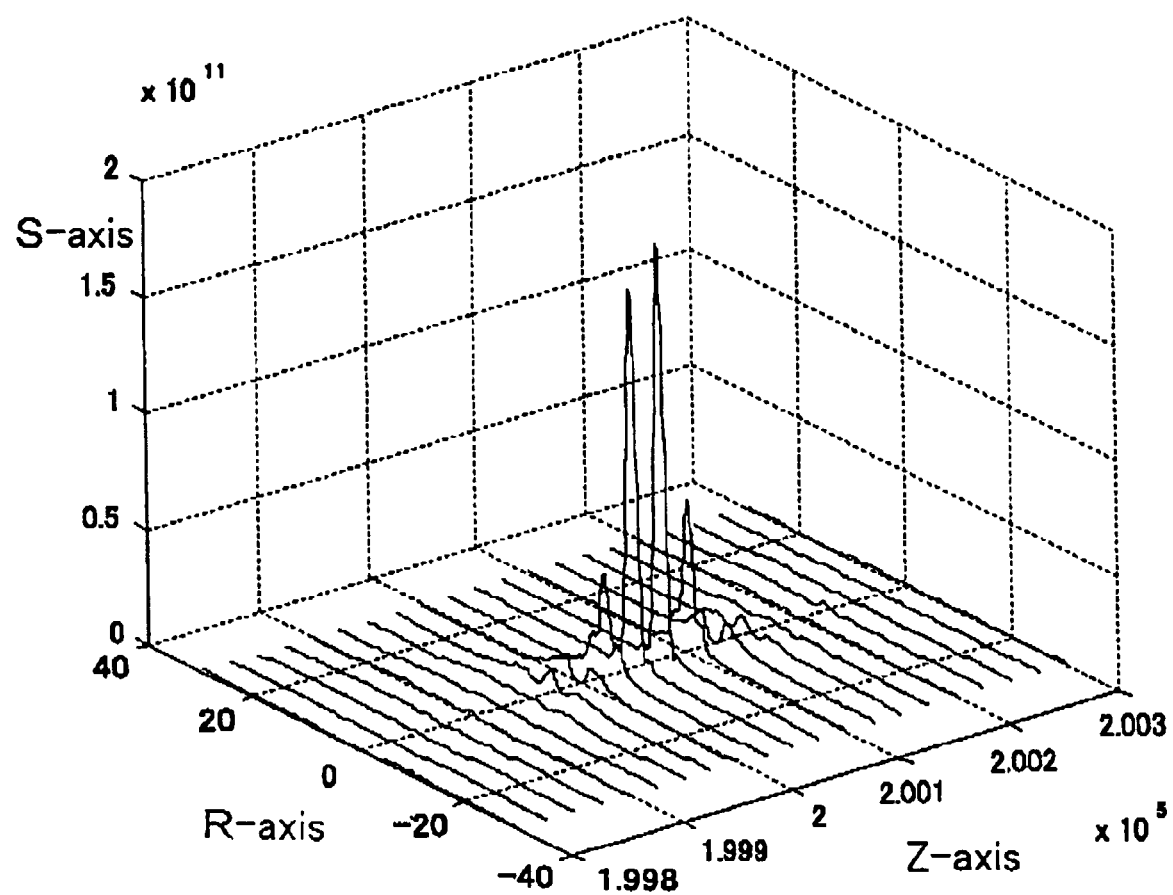
FIG. 6 is a diagram illustrating the state of image formation attained by the conventional imaging system.

For the purpose of comparison, the results of the calculation of the light intensity in the domain of focal points due to the image formation using the conventional optical system (in other words, the method of imaging with one convex lens system) are shown in FIG. 6. The coordinate axes of FIG. 6 are the same as those of FIG. 5. FIG. 5 and FIG. 6 both depict the appearances of image formation within the range of 500 μm of the Z axis. FIG. 6 shows the results of the calculation performed with a telescopic lens operating with the same wavelength and having a diameter of 5 cm and $f_1$=20 cm and using L=1 km. The depth of the focal point has virtually no change, though the position of the focal point is shifted toward the interior in accordance as the distance L to the object is shortened.

The results of FIG. 5(A) and FIG. 5(B) indicate that the focal point shown therein has a greater depth than that shown in FIG. 6. It is further noted that in the case of L=1 km shown in FIG. 5(A) and in the case of L=100 m as shown in FIG. 5(B), a common image forming region exists in the neighborhood of 5.06 cm. When FIG. 5(B) is compared with FIG. 6, it is noted that in FIG. 5(B), the sizes of the light spots at the focal points (peak width at half height of each peak) are smaller over a wide range. The sizes of the light spots at the focal points are decreased because the widths of the main lobes of a light intensity profile at the focal points are narrowed from the ordinary diffraction limits by the effect of the annulus of the Fresnel integral as stated previously. Though the side lobes are enlarged at this time, it has been demonstrated by simulation and experiment that this enlargement has little effect on photography. While it is known in the field of optics that in the opening of the annulus, the width of the main lobe of the light intensity pattern is narrowed more by the Fourier transformation of the opening than in the full circular aperture opening, the fact that the image formation results in exalting the resolution within the diffraction limit may be understood as a similar phenomenon.

From the foregoing explanation, it is evident that the imaging system according to this invention is capable of accomplishing photography with high resolution without requiring a change in the position of the focal plane over a wide range of distance.

Next, the fact that the imaging system of this invention is capable of reducing the influence of atmospheric turbulence will be described. Formula 12 is the formula which concerns the situation devoid of the effect of atmospheric turbulence in a propagation path. The axial symmetry cannot be available when the effect of atmospheric turbulence exists. To the situation involving the fluctuation of the atmosphere, the following formula of Formula 15 applies, in which formula F denotes the amplitude part of $u(\rho)$, the exponent exp denotes the phase part, $\Phi$ denotes the phase fixed by the optical component, and S denotes the phase varied by the fluctuation of the atmosphere.

$$I(P) = u(P)u'(P) \quad \text{(Formula 15)}$$
$$= c_1^2 \int\int F(\rho', \phi')F^*(\rho'', \phi'') \times$$
$$\exp\{-i(\Phi' - \Phi'')\}\exp\{-i(S' - S'')\}$$
$$\rho' d\rho' d\phi' \rho'' d\rho'' d\phi'')$$

In the formula, the asterisk mark * designates the complex conjugate.

Here, the variable phase (S'−S") represents the difference of phase between two points on the wavefront of light. The wavefront of light of the image forming lens surface is capable of returning the beam of light and projecting it on the objective surface and, therefore, equals the difference of phase between the two points on the aperture of the light reception.

The influence of the fluctuation of the atmosphere will be considered on the basis of Formula 15. Since the difference of phase (S'−S") varies randomly, the general variation of Gaussian distribution will be assumed and the amount of variation (i.e. the standard deviation) will be denoted by $\sigma$. The variable part in Formula 15 is limited to the part of exp inclusive of (S'−S"). When the invariable part excluding the foregoing variable part is denoted by $I_0(P)$, the average value <I(P)> of the variation of intensity turns out to be a mathematically simple formula shown below because the variation of phase constitutes a Gaussian distribution.

$$<I(P)> = I_0(P)\exp(-\sigma^2/2) \quad \text{(Formula 16)}$$

Since $\sigma^2$ is proportional to a distance between the two points in the opening surface raised to the 5/3'th power, namely the average of $\rho^{5/3}$, it is nearly proportional to the area. Thus, the variation of intensity is large because it varies by Formula 16 as an exponential function of area approximately. On the other hand, the light intensity in the absence of fluctuation is proportional to the area of the aperture integrated by the principle of Fresnel integral. From the foregoing description, it is concluded that by the method of this invention, the light intensity is decreased in proportion to the effective area because the effective area of the Fresnel integral changes from the full aperture to an annulus. The magnitude of the variation, however, decreases at a ratio more than proportional to the area because the variation of intensity is proportional to an exponential function of a value approximating the area. This principle decreases the influence of the fluctuation of the atmosphere.

Figure 7:
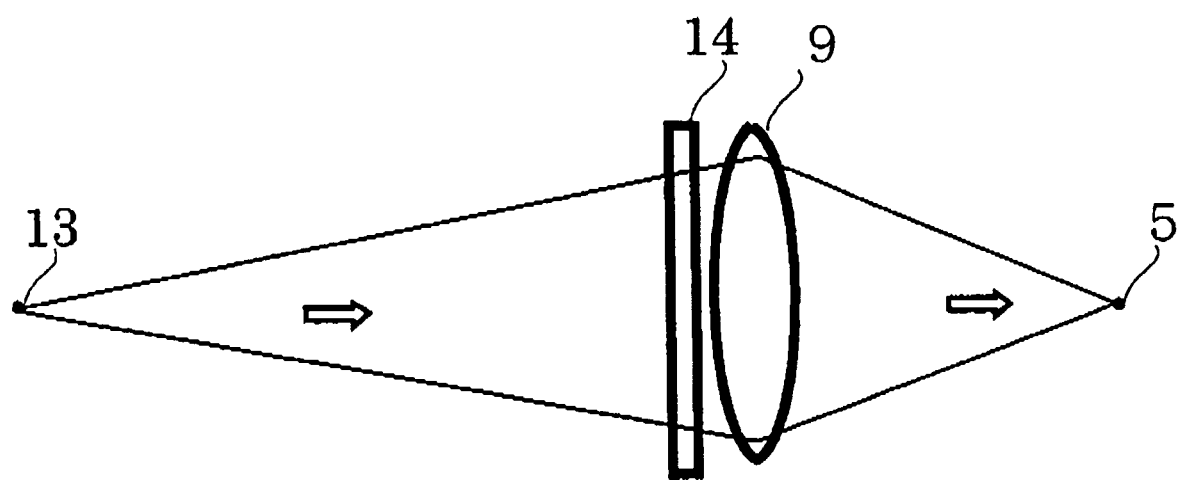
FIG. 7 is a diagram illustrating the configuration of the imaging system with a wavefront controlling plate in front of an image forming lens.

Next, yet another characteristic feature of this invention, namely the technique of placing an optical device containing a wavefront controlling plate in front of an image forming lens, will be described. The concept of the imaging system with a wavefront controlling plate in front of an image forming lens is shown in FIG. 7. The wavefront controlling plate is also provided with the function of causing the phase to be delayed more in accordance as the radial distance from the optical axis is increased toward the aperture edge. Here, the technique using the wavefront controlling plate will be described for the sake of illustration. For the purpose of simplifying the description, the wavefront controlling plate which possesses this function will be regarded as equaling a concave lens possessing a negative spherical aberration. The following formula in which "f" denotes the focal length of the concave lens, $f(\rho)$ is defined anew because the lens possesses an spherical aberration and allows "f" to vary relative to the radius $\rho$, wherein L denotes the distance to an object, and (1/b) denotes the curvature of the wavefront of the light emitted from the concave lens, therefore, is established.

$$-\frac{1}{f(\rho)} = \frac{1}{L} + \frac{1}{b} \quad \text{(Formula 17)}$$

Then, on the condition that $f_c$ denotes the focal length of the image forming lens and q denotes the distance of the image forming point (the term 1/q denoting the curvature of the wavefront of light forming the image), the following formula is satisfied because the wavefront of light having the curvature of 1/b according to Formula 17 is entered into the image forming lens.

$$\frac{1}{f_c} = \left\{\frac{1}{f(\rho)} + \frac{1}{L}\right\} + \frac{1}{q} \quad \text{(Formula 18)}$$

The situation in which the distance of the object is simply regarded as infinite, since L is enough larger than $f_c$, thus L=∞, with the object of reviewing the basic state of the lens is expressed by the following formula.

$$\frac{1}{q} = -\frac{1}{f(\rho)} + \frac{1}{f_c} \quad \text{(Formula 19)}$$

The right side of Formula 19, in which the first term corresponds to the curvature due to the wavefront controlling plate and the second term to the curvature due to the image forming lens itself, indicates that the curvature of the wavefront of the image forming light is the sum of the two curvatures.

Here, the situation in which the image forming lens is conferred with the equivalent function, i.e. that the curvature 1/q equals the curvature of the wavefront due to the lens of a focal length $f_c$ possessing the spherical aberration $S(\rho)$, is expressed by the following formula.

$$\frac{1}{q} = \frac{1}{f_c + S(\rho)} \quad \text{(Formula 20)}$$

The condition of the wavefront controlling plate existing in this case will be sought. From the relation of Formula 19, Formula 20 and $f_c \gg S(\rho)$, the following formula is derived.

$$-\frac{1}{f(\rho)} = \frac{1}{f_c + S(\rho)} - \frac{1}{f_c} = \frac{-S(\rho)}{f_c^2} \quad \text{(Formula 21)}$$

The right side of Formula 21 becomes a very small value when the focal length $f_o$ is large. When the wavefront controlling plate is required to be equivalent to the concave lens, therefore, it must possess an extremely small curvature (namely an extremely large focal length) and also possess a spherical aberration. When the magnitude $\Delta_c$ of the spherical aberration $S(\rho)$ at the aperture edge $\rho=1$ is set by $\Delta_c=-600$ μm in the same way as when the results of FIG. 5 are obtained and the focal length $f_o$ of the image forming lens is set at $f_o=20$ cm, for example, the equivalent focal length at the opening diameter terminal is found to be 67 m in accordance with Formula 21. At the central part ($\rho=0$), the curvature is 0 (the focal length=∞). When the focal length $f_c$ of the image forming lens is short, the curvature of the wavefront is increased in inverse proportion to $f_o^2$ and the equivalent focal length is shortened.

Figure 8:
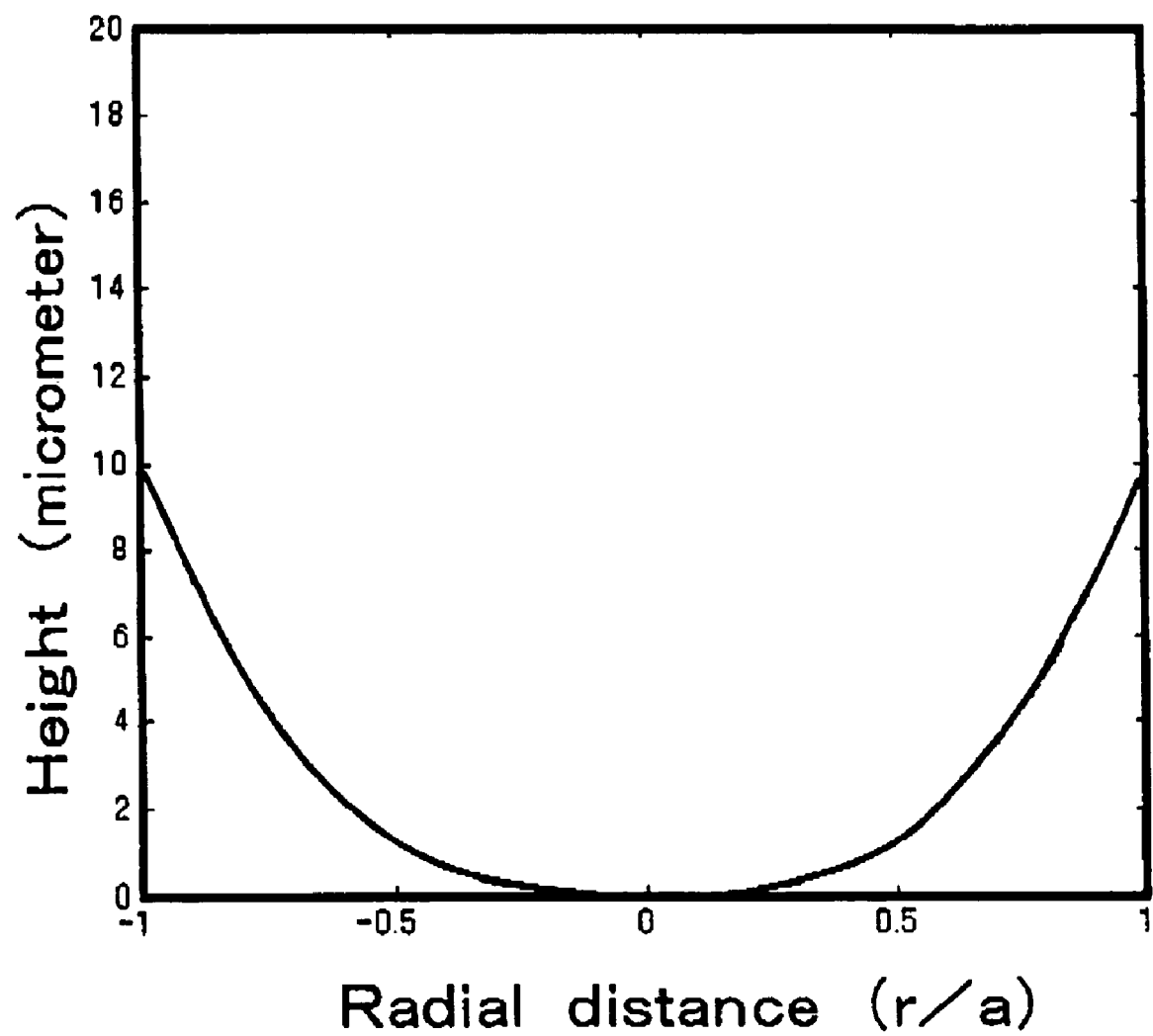
FIG. 8 is an example of the wavefront produced by a wavefront controlling plate. Downward is a direction of the light propagation.

An example of wavefront after passing through the wavefront controlling plate is shown in FIG. 8. The light has a wavefront in which the curvature increases in accordance as the radial distance from the optical axis increases since the light phase is delayed in accordance with increase of the radial distance by the wavefront controlling plate. It is to be noted that the light after passing through the image forming lens (See FIG. 7) has a wavefront in which the curvature is decreases in accordance with increase of the radial distance. The mechanism of wavefront change can be understood from the Formula 19.

The preceding description has covered the optical components using all sorts of lenses including an objective, an eyepiece and an image forming lens. It is evident that optical components equivalent thereto can be configured by using concave mirrors and other equivalent optical components other than the lenses mentioned above.

The principle of the configuration requiring an optical component for manipulating the wavefront to be placed in front of a first optical component which is an image forming component has been described. This principle similarly applies to the case of placing a naked eye in the place of the image forming component. Thus, this invention can be applied when the naked eye is used for observing the object.

The imaging system or the optical device contemplated by this invention, as described above, is capable of deepening the focal depth of the formed image and decreasing the spot size of the formed image and also suppressing image blurring and degradation of the resolution due to the fluctuation of the atmosphere and, consequently, enabling an object to be imaged over a wide range distance without changing the position of the focal plane and with a high resolution. This characteristic feature of the invention is effectively utilized in imaging an object in motion. Thus, this invention can be widely applied to various kinds of cameras including telescopic cameras, to a wide range of measurements, to monitors and the like.

What is claimed is:

1. An imaging system comprising:
   a first optical component serving as an image forming part;
   a second optical component being a concave lens-type special optical plate that has a focal length infinite in a central part thereof and finite in a periphery thereof, disposed in front of the first optical component relative to an incident light wave; and
   a configuration provided jointly on the first and the second optical components for forming an image on a focal plane;
   light past the second optical component having a light wave phase delayed in accordance as a radial distance from an optical axis is increased and having a special wavefront in which a curvature thereof increases in accordance as a distance from the optical axis increases after passing the second optical component; and
   the wavefront curvature after passing through an image forming lens at the image forming part being decreased in accordance with increase of the radial distance.

2. An optical component disposed in front of an eye or an imaging camera including a system with an image magnifier including a telescope, wherein said optical component comprises a concave lens-type wavefront controlling plate having a focal length infinite in a central part thereof and finite in a periphery thereof, and serving to control a shape of a wavefront of light passing through said optical component, and the light past said wavefront controlling plate has a light wave phase delayed in accordance as a radial distance from an optical axis is increased and has a wavefront in which a curvature thereof increases in accordance as the radial distance from the optical axis increases after passing through said optical component, and consequently, and the wavefront curvature after passing through an image forming lens of the imaging camera is decreased in accordance with increase of the radial distance.

* * * * *